United States Patent [19]
Sukup

[11] Patent Number: 4,854,719
[45] Date of Patent: Aug. 8, 1989

[54] GRAIN STIRRING APPARATUS

[76] Inventor: Eugene G. Sukup, Beeds Lake, Hampton, Iowa 50441

[21] Appl. No.: 166,326

[22] Filed: Mar. 10, 1988

[51] Int. Cl.[4] .......................... B01F 7/24; F16H 21/16

[52] U.S. Cl. .......................................... 366/261; 74/27; 366/282; 366/331

[58] Field of Search ............... 366/261, 282, 331, 345, 366/346; 74/25, 27, 89; 242/158.4 R

[56] References Cited

U.S. PATENT DOCUMENTS

| | | | |
|---|---|---|---|
| 2,539,667 | 1/1951 | King | 242/158.4 R |
| 2,940,322 | 6/1960 | Uhing | 74/27 X |
| 3,584,842 | 6/1971 | Sukup | 366/261 |
| 3,776,512 | 12/1973 | McKinnon | 366/261 |
| 3,937,308 | 2/1976 | Sukup | 366/261 X |
| 4,274,750 | 6/1981 | Smit | 366/261 |

*Primary Examiner*—Harvey C. Hornsby
*Assistant Examiner*—Scott J. Haugland
*Attorney, Agent, or Firm*—Neuman, Williams, Anderson & Olson

[57] ABSTRACT

Grain stirring apparatus includes a stirrer and a stirrer drive motor which are supported on a carrier which is reciprocably movable along a rotatable shaft, the shaft being supported on a carriage for movement in a direction transverse to the movement of the carrier along the shaft. A roller frictionally engages the shaft and is supported on a support member which is supported on the carrier for shiftable pivotal movement about a fixed shift axis between two positions, for effecting reciprocable rectilinear movement of the stirrer carrier along the shaft. The roller support member includes a gear which is meshed with a pair of gears which are journalled on the carrier for rotation about axes in fixed relation to the carrier and which carry members for engagement with members which project from the shaft, to shift the support member from one position to the other.

10 Claims, 3 Drawing Sheets

FIG. 2
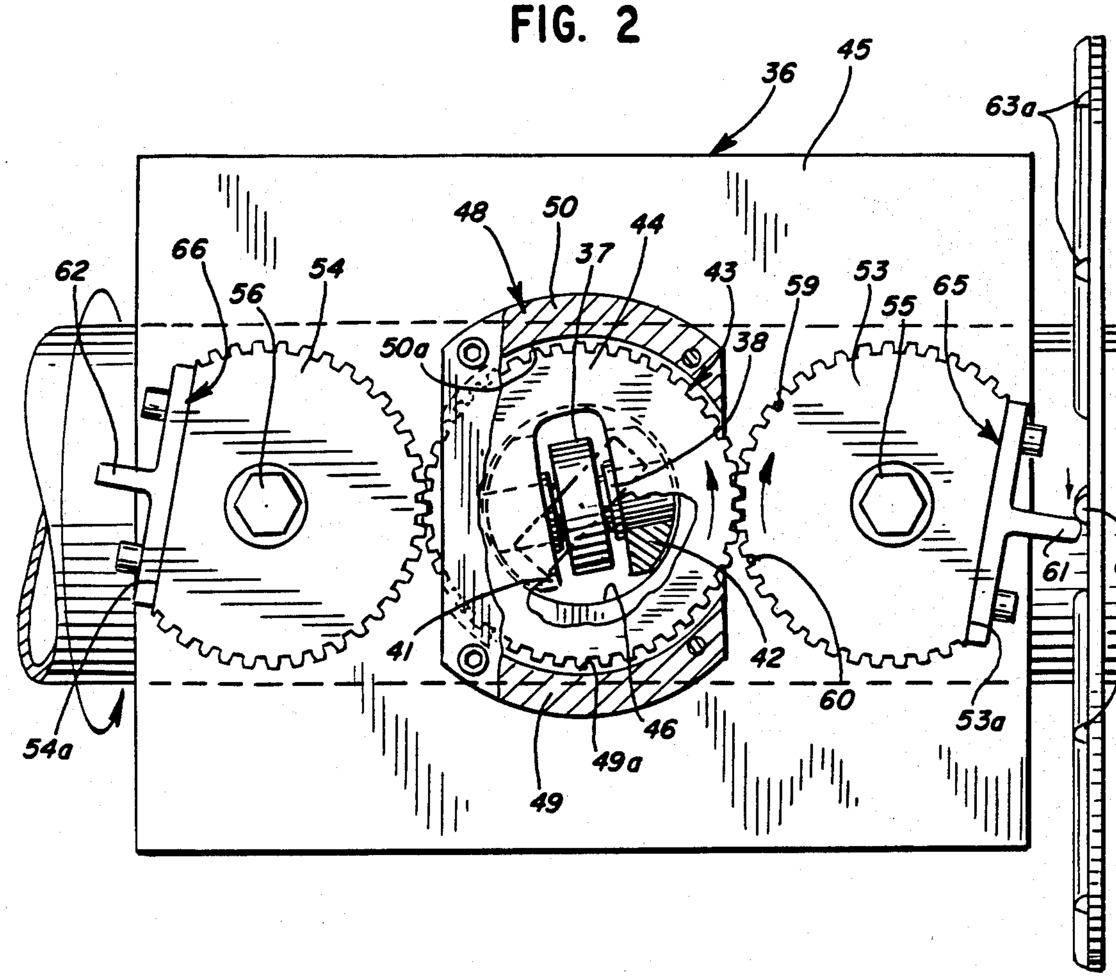
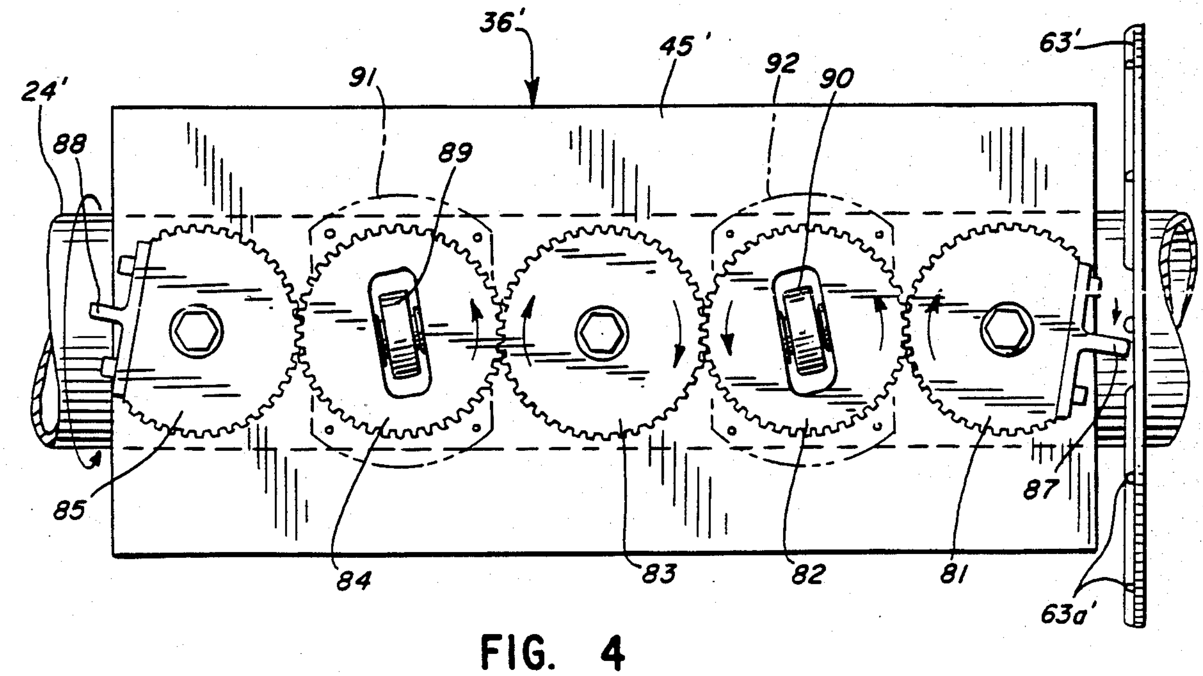
FIG. 4

GRAIN STIRRING APPARATUS

BACKGROUND OF THE INVENTION

1. Field of the Invention

This invention relates to grain stirring apparatus and more particularly to grain stirring apparatus for stirring and aerating grain in a storage bin to prevent spoilage thereof. The apparatus of the invention is rugged in construction and provides trouble-free, reliable and efficient service while being economically manufacturable.

2. BACKGROUND OF THE PRIOR ART

An apparatus for stirring and aerating grain is disclosed in the Sukup U.S. Pat. No. 3,584,842 in which a stirrer is formed with a helical blade and is rotated about a vertical axis while being moved horizontally in a path such that substantially all grain in a bin may be periodically stirred and aerated. In apparatus for a circular bin as illustrated in said patent, a carriage is rotated about a central vertical axis of the bin while a carrier structure on the carriage is moved back and forth, radially inwardly and outwardly, the stirrer being supported from the carrier structure. An apparatus for a rectangular bin is disclosed in the Sukup U.S. Pat. No. 3,584,842 and is illustrated in the Sukup U.S. Pat. No. 3,937,308, in which a carriage is moved from one end of a bin to the other while a stirrer carrier structure is moved back and forth between the sides of a bin.

To effect the back and forth movement of the carrier structure, a horizontal shaft is provided and a drive roller is so disposed that its periphery frictionally engages the horizontal shaft to move the carrier structure along the shaft which is controlled by the orientation of the axis of the drive roller and which is reversed at each end of a range of travel of the carrier structure. To reverse direction, the drive roller is supported from a straight rod which has its opposite ends pivotally connected to additional rods, each of the additional rods being loosely passed through a pair of loops on a carrier frame structure. The outer ends of the additional rods are engageable by beads on the faces of circular plates which are mounted on the shaft and they act to shift the loosely supported rod which carries the drive roller and to reverse the direction of movement of the stirrer carrier structure at each end of a range of travel thereof. Two support rollers are provided to transfer the weight of the carrier frame to the drive roller by means of flat bars. Another support roller is provided for lending lateral support and limiting transverse movement of the drive roller in one direction. The stirrer and a drive motor assembly are positioned on opposite sides of a vertical plane through the shaft axis.

SUMMARY OF THE INVENTION

This invention was evolved with the general object of providing an improved grain stirring apparatus, particularly with respect to providing an apparatus which is trouble-free and reliable in service and which is also economically manufacturable.

Important aspects of the invention relate to the discovery of problems with the prior art constructions and in finding the sources of such problems. It is found that the apparatus as disclosed in the aforesaid patents, while having many advantageous features, nevertheless may develop problems with respect to providing reliable service over long periods of time.

It is found in particular that the looseness of the reversing assembly as disclosed in the aforesaid U.S. Pat. No. 3,584,842 contributes to reliability problems and also the construction is such that it is expensive to manufacture with a relatively large number of component parts and problems in assembly thereof. However, it is also found that features of the construction as disclosed in that patent are highly desirable, particularly with respect to using the friction roller for effecting the drive of a carrier structure along a horizontal shaft and with respect to applying the weight of the carrier structure and elements carried therefrom to the friction roller. The prior construction has another important feature in that shifting forces are positively applied, avoiding problems with alternatives such as spring-urged over-center toggle linkages.

In apparatus constructed in accordance with this invention, a friction roller is used in a manner like that in the aforesaid U.S. Pat. No. 3,584,842, but a simplified support is provided, using a bearing arrangement which acts directly between a roller support member and a carrier structure to journal the support member for shiftable pivotal movement about a shift axis which is in substantially fixed relation to the carrier structure. This arrangement not only has the advantage of simplicity but has very important functional advantages in that it eliminates the looseness of the prior construction, facilitates construction of the apparatus and makes other advantages possible.

In accordance with specific features of the invention, the bearing for the roller support member includes thrust bearing surfaces which are interengageable in a plane which is transverse to the vertical shift axis. The thrust bearing surfaces serve to prevent any canting movement of the support member relative to the carrier structure and may also be non-lubricated surfaces so as to frictionally hold the roller in each of its shift positions. The latter advantage is especially important when positive shifting means are employed. Preferably, the plane of the thrust bearing surfaces is horizontal and the weight of the carrier structure is applied through such surfaces into the roller.

Another important feature of the invention relates to the provision of a pair of force transmitting means on the carrier structure for transmitting shifting forces to the roller supporting means at the limits of travel of the carrier structure. In a preferred embodiment, the force transmitting means include a pair of members which are pivotally supported on the carrier structure for movement about vertical axes in spaced relation to and on opposite sides of a vertical shift axis. The paths of movement of the force transmitting means are in substantially fixed relation to the carrier structure, further obviating any looseness of the mechanism and further contributing to its reliability.

In accordance with further specific features of the invention, the pivotal force-transmitting members have gear teeth which mesh with gear teeth on the roller support member to effect pivotal movement of the roller support member between its two shift positions. The force transmitting members include arms which project into the path of angularly spaced engagement elements on the horizontal shaft, thereby obtaining a positive shifting action which is highly desirable. With the combination of the positive shifting action and the aforementioned support of the roller support member, highly reliable operation is obtained, avoiding the potential problems which are inherent in other possible reversing mechanisms such as over-center toggle linkages and the like.

This invention contemplates other objects, features and advantages which will become more fully apparent from the following detailed description taken in conjunction with the accompanying drawings.

BRIEF DESCRIPTION OF THE DRAWINGS

FIG. 2 is a top plan view of a carrier structure and associated components of the apparatus, certain parts being broken away;

FIG. 4 is a view similar to FIG. 2, illustrating a modified construction.

DESCRIPTION OF PREFERRED EMBODIMENTS

Figure 1:
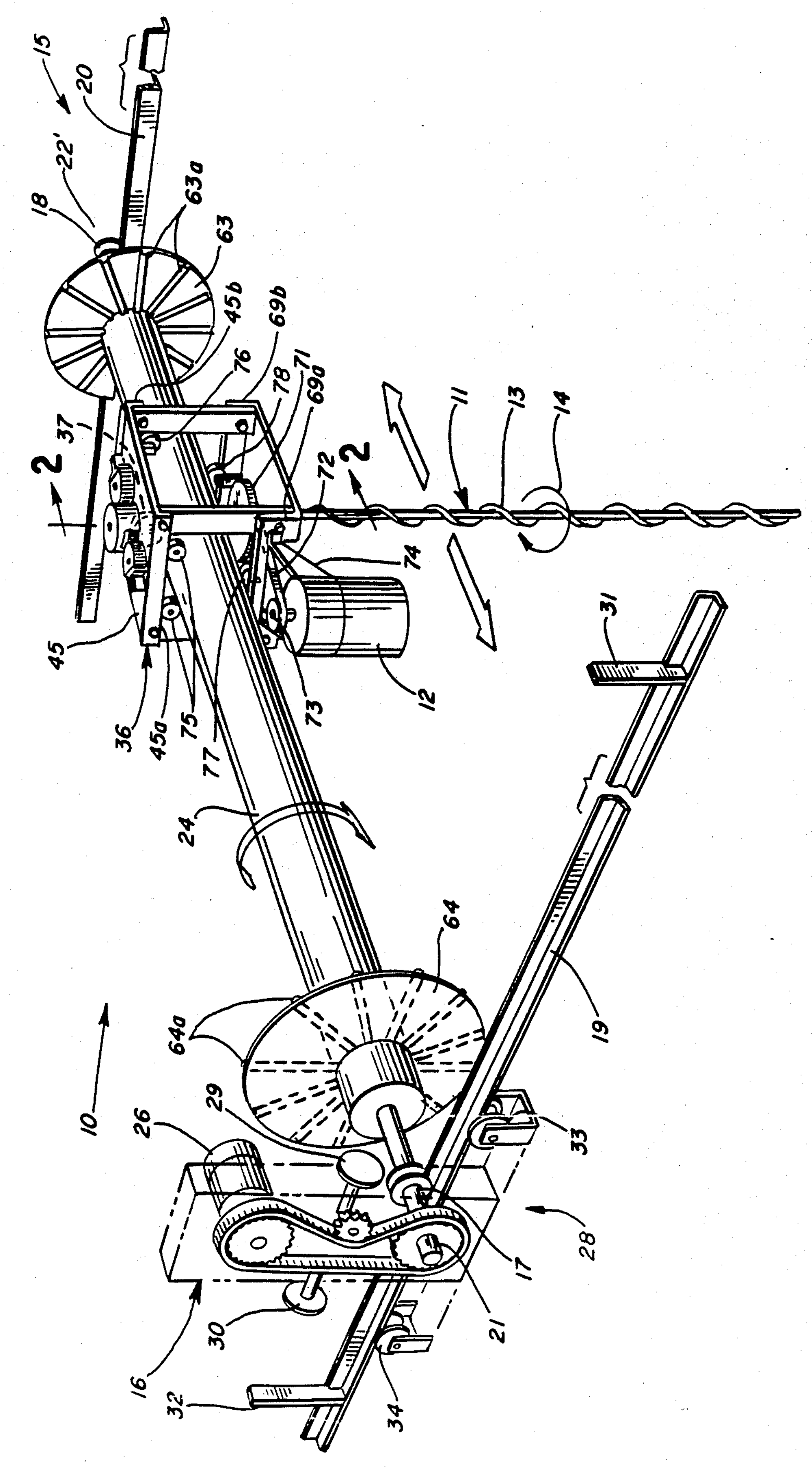
FIG. 1 is a perspective view illustrating grain stirring apparatus constructed in accordance with the invention.
Figure 3:
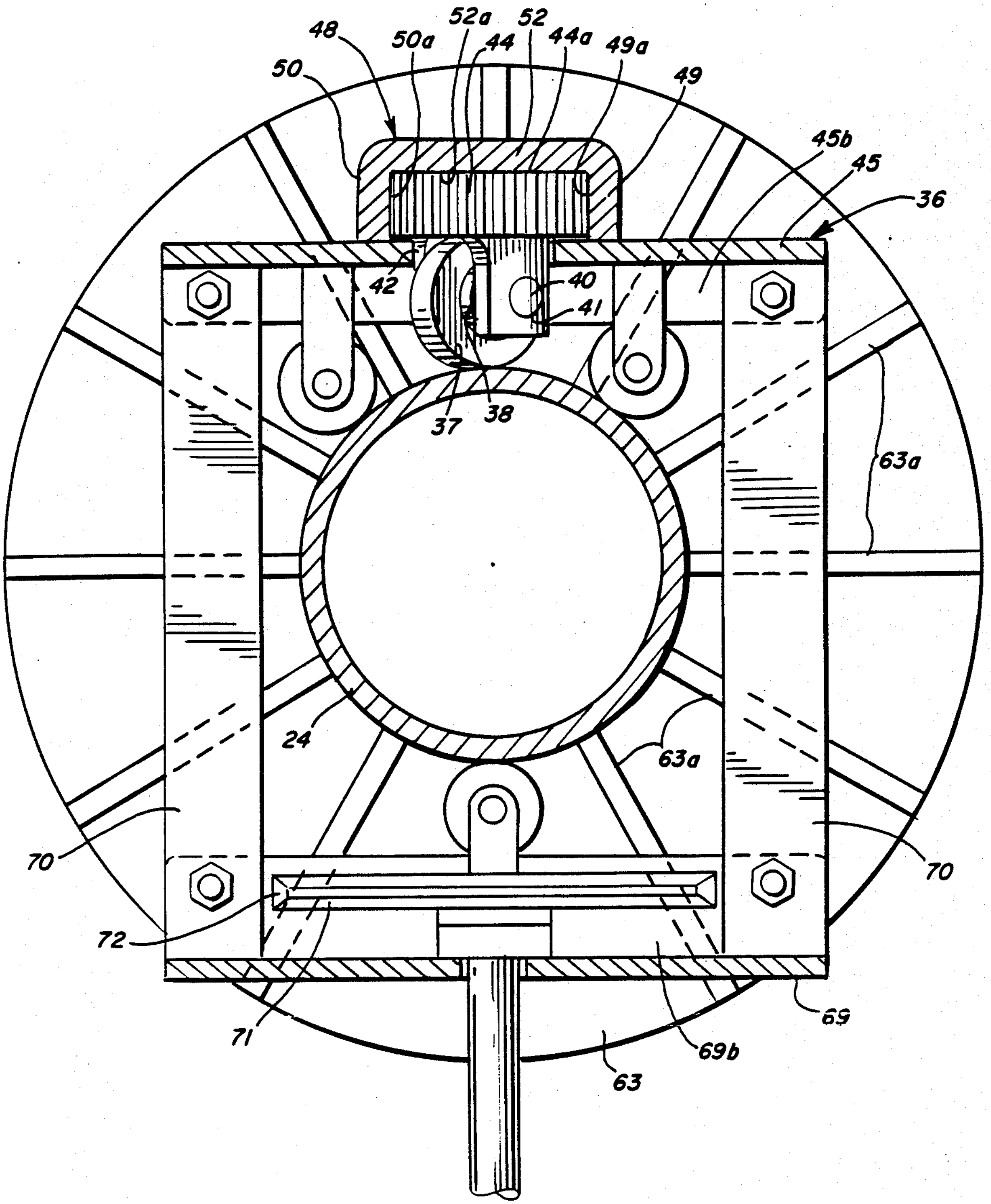
FIG. 3 is a cross sectional view taken substantially along line III—III of FIG. 2.

Reference numeral 10 generally designates grain stirring apparatus constructed in accordance with the principles of this invention. The illustrated apparatus 10 comprises a stirrer 11 which extends downwardly into grain in a grain bin. The stirrer 11 is driven from an electric motor 12 to rotate a spiral blade 13 thereon in a direction as indicated by arrow 14, such that grain engaged by the blade 13 will be moved upwardly.

Reference numeral 15 generally designates a traversing mechanism which is provided for moving the stirrer 11 horizontally through the grain while it is rotated. The illustrated mechanism is operative to effect reciprocable movement of the stirrer 11 in a first horizontal direction, back and forth between a first pair of limit positions adjacent opposite sides of a bin, while also effecting reciprocable movement of the stirrer in a second horizontal direction transverse to the first, back and forth between a second pair of limit positions adjacent opposite ends of a bin. Over a period of time, the stirrer 11 may be moved through substantially all the grain in a rectangular bin for efficient mixing and aerating of the grain.

A carriage 16 of the traversing mechanism 15 includes a pair of flanged wheels 17 and 18 which ride on a pair of side rails 19 and 20. Wheels 17 and 18 operate as drive wheels for back and forth movement from end to end of a bin and are secured on small diameter extensions 21 and 22 of a larger diameter shaft 24 which extends transversely between the side rails 19 and 20. The extension 21 and thereby the drive wheels 17 and 18 and shaft 24 are driven by an electric motor 26 through a speed reduction unit and a gear belt or chain drive assembly 28. At opposite limits of travel in an endwise direction, switch operators 29 and 30 engage limit stops 31 and 32 to operate switches, not shown, and reverse the direction of the rotation of the drive motor 26. Additional flanged wheels 33 and 34 are provided on the carriage 16 for engaging the rail 19 to provide stability. The construction and operation are similar to those disclosed in the aforesaid U.S. Pat. No. 3,937,308, the disclosure thereof being incorporated by reference, and it will be understood that the cable take-up arrangement and other features as disclosed in that patent may be included.

The stirrer 11 is carried by a carrier structure 36 which is driven back and forth along the transverse shaft 24 in response to forces developed by a drive roller 37 which is carried by the structure 36 and which has its peripheral surface fictionally engaged with the surface of the shaft 24. The direction of movement is determined by the direction of rotation of the shaft 24 and the orientation of the axis of the roller 38. At a limit of travel in each direction, the axis of the roller 38 is shifted from one shift position to another, the axis in each shift position being at an acute angle to a line which is parallel to the axis of the shaft 24 so as to develop a force in a direction parallel to the axis of the shaft 24. The shift position angles are opposite to one another relative to a plan normal to the axis of shaft 24 to effect reversal of the direction of movement of carrier structure 36 and stirrer 11 along the shaft 24 while the shaft 24 rotates in one direction. Important features of the invention relate to the connection of the drive roller 37 to the carrier structure 36 in a manner such as to obtain smooth and reliable operation. In the construction as shown, the roller 37 is formed by an outer race member of a standard bearing and is journalled by ball bearings on an inner race member 38 which is supported on a shaft 40 between a pair of depending legs 41 and 42 of a support member 43. The support member 43 includes a gear 44 to which the upper ends of the depending legs 41 and 42 are welded or otherwise secured.

The gear 44 of the support member 43 is disposed on top of an upper plate 45 of the carrier structure 36. The legs 41 and 42 of the support member 43 extend downwardly through a circular opening 46 in the upper plate 45, with outer surface portions of the legs 41 and 42 being cylindrical and being in closely spaced bearing relation to the inner cylindrical surface of the opening 46 so as to limit displacement of the axis of the support member from the axis of the opening 46. A cap member 48 is disposed over the gear portion 44 and is bolted or otherwise secured thereto, bolts being shown. Cap member 48 includes a pair of side wall portions 49 and 50 which provide internal cylindrical surface portions **49*a* and 50*a* in concentric relation to the opening 46, and in closely spaced relation to the outer surfaces of the teeth of the gear portion 44, for additionally journalling the member 43 for movement about a vertical axis in fixed relation to the carrier structure 36**.

The cap member 48 further includes an upper horizontal wall portion 52 which has a lower planar surface **52*a* disposed over an upper planar surface 44*a* of the gear portion 44**, to provide a thrust bearing.

With this arrangement, the roller 37 is shiftable about a vertical shift axis which is in substantially fixed relation to the carrier structure 36. In addition, a thrust bearing arrangement is obtained such that downward forces applied by the carrier structure 36, from the weight of the carrier structure and the stirrer and stirrer drive components carried thereby and from rotation of the stirrer 11, may be applied in large part directly to the roller 37 to firmly hold the periphery of the roller 37 in engagement with the upper surface of the shaft 24 and to prevent unintentional or uncontrolled canting movement of the roller 37 relative to the carrier structure 36. These features are important in obtaining smooth, trouble-free and reliable drive of the carrier structure back and forth in a sidewise direction along the shaft 24 and in response to rotation of the shaft 24. The friction between the surfaces **44*a* and 52*a* is of substantial magnitude, insuring that the drive roller support member 43** will remain in either position to which it is shifted until shifted to the opposite position by the application of a positive shift force thereto.

Further important features relate to the application of positive shifting forces to the drive roller support member 43 for intentional predetermined shifting of the axis of the roller between its two shift positions and to obtain a reversal of the direction of movement at each limit of travel in a sidewise direction. In the arrangement as illustrated, shifting forces are applied to the roller support member 43 by means of a pair of gears 53 and 54 which are rotatable about vertical axes which are in fixed relation to the carrier structure 36 and which are on opposite sides of the shift axis. Gears 53 and 54 are meshed with portions of the gear 44 which extend out between the side wall portions 49 and 50 of the cap member 48 and they are journalled on shank portions of two bolts 55 and 56 which are secured on the upper plate 45 by means of nuts on the underside of plate 45. Angular displacement of the gears is limited by a pair of pins 59 and 60 which are welded between teeth of the gear 53, as shown. It will be understood that other forms of stop means may be employed.

The gears 53 and 54 carry arms 61 and 62 which are arranged to extend into the path of engagement members carried by the shaft 24. As shown, two circular plates 63 and 64 are secured to the opposite ends of the shaft 24, the plates having radially extending engagement members **63*a* and 64*a* formed thereon in angularly spaced relation. In the construction as illustrated, the arms 61 and 62 are formed by portions of generally T-shaped members 65 and 66 which are secured by machine screws to chordal surface portions 53*a* and 54*a* of gears 53 and 54** which may be formed by cutting off portions of standard gears.

In operation, the carrier structure 36, as it is moved in one direction toward one of the end plates 63 and 64, will ultimately reach a position in which one of the arms 61 or 62 is in the path of movement of the engagement members **63*a* or 64*a* on one of the plates 63 or 64. At this point, the engaged arm will be rotated by the engagement member to rotate the associated gear 53 or gear 54 and to rotate the gear 44 and roller support member 43 about the vertical shift axis and shift the roller 37** to an opposite position.

FIG. 2 illustrates the position of the parts at one point during a shifting operation. As shown, the direction of rotation of the shaft 24 is such that the upper side of the shaft is moving toward the viewer, and the engagement of the member **63*a* with the arm 61 is causing the gear 53 to be rotated in a clockwise direction and thereby causing the gear 44 of the roller support member 43 to rotate in a counterclockwise direction. With further rotation of the shaft 24, the roller 37 will reach a position in which a tooth of gear 44 engages or is close to engagement with the stop pin 60 on gear 53. Then the roller 37 will be in a position to drive the carrier structure 36 away from the plate 63 and toward the plate 64 as the shaft 24 continues to rotate in the same direction. When the arm 62 is placed in the path of the engagement members 64*a* of the plate 64**, another reversing operation will take place in a similar manner.

The gears 53 and 54 together with the arms 61 and 62 thus function to transmit positive shifting forces from the engagement members **63*a* or 64*a* to the roller support member 43, overcoming frictional forces applied to the gears 53 and 54 and the drive roller support member 43 and gear 44 thereof. The gears 53 and 54 move in fixed paths relative to the carrier structure, being pivotal about fixed axes in the illustrated arrangement, and as a result, the conditions for effecting shifting movements are uniformly obtained to insure highly reliable and trouble-free operation. Once shifted into one or the other of the shift positions, the roller support member 43 will remain in position as a result of frictional forces, especially since a relatively large frictional force is applied between the thrust bearing surfaces 44*a* and 52*a***.

To support the stirrer 11 and its drive motor 12, the carrier structure 36 includes a lower plate 69 which is suspended from the upper plate 45 by four corner members 70 secured between down-turned side flange portions **45*a* and 45*b* of the upper plate 45 and up-turned side flange portions 69*a* and 69*b* of the lower plate 69. The upper end of the stirrer 11 is journalled by the lower plate 69 and is connected to a large diameter pulley 71 which is driven through a belt 72 from a small diameter pulley 73 on the shaft of the motor 12, a mounting bracket 74 of the motor 12 being secured to the flange portion 69*a* of the lower plate. The axis of the motor 12 and its center of gravity are in vertical alignment with the axis of shaft 24**.

To stabilize and position the carrier structure during its movement along the shaft, a pair of anti-friction elements 75 are supported from the flange portion **45*a* of top plate 45 and another pair of anti-friction elements 76 are supported from the other flange portion 45*b* of the top plate 45 at positions spaced angularly from a vertical plane though the axis of shaft 24. In addition, a pair of anti-friction elements 77 and 78 are supported on the flange portions 69*a* and 69*b* of the lower plate, in vertical alignment with the axis of shaft 24. The elements 75–78 function to prevent any substantial tilting movement of the carrier structure and parts carried thereby about a horizontal axis transverse to the axis of the shaft 24 and further insure reliable interengagement of parts during reversing operations. Elements 75–78 are roller elements in the illustrated embodiment but may advantageously be ball elements to minimize friction in a longitudinal direction parallel to the axis of shaft 24 as well as to minimize friction about the axis of the shaft 24**.

FIG. 4 is a view similar to FIG. 2, but diagrammatically illustrates a modified construction in which five gears 81–85 are intermeshed to form a gear train and are supported on a top plate 45' of a carrier structure 36' for rotation about axes in a vertical plane in alignment with the horizontal axis of a shaft 24' between a circular plate 63' as shown and another plate which is not shown but which is similar to plate 64 of the first embodiment. The end gears 81 and 85 carry arms 87 and 88 for engagement by engagement members **63*a*' of plate 63' and similar members of the other plate. The gears 82 and 84 are like the gear 44 of the first embodiment and are parts of support members which journal rollers 89 and 90 like the roller 37. Cap members 91 and 92, which are like the cap member 48, extend over the gears 82 and 84 and provide bearing support in the same manner. The center gear 83 acts as an idler to insure equal rotations of the roller support gears 82 and 84 in the same direction. With this arrangement, the two drive rollers 89 and 90 engage the shaft, rather than only the one roller 37** of the first embodiment, the operation being otherwise like that of the first embodiment. It will be understood that additional gears and associated rollers may be added, using the same principles as illustrated by the embodiment of FIG. 5.

It will also be understood that the invention may be applied to apparatus for use with circular bins and to other equivalent forms of apparatus.

It will be further understood that other modifications and variations may be effected without departing from the spirit and scope of the novel concepts of this invention.

I claim:

1. Apparatus for stirring grain stored in a grain bin and including a stirrer for extending downwardly into grain in said bin, and a traversing mechanism for extending over said grain and moving said stirrer in a horizontal direction through the grain, said traversing mechanism including a generally horizontal shaft, means for rotating said shaft in at least one direction about a longitudinal shaft axis, a carrier structure arranged to carry said stirrer and supported by said shaft for reciprocable rectilinear movement along said shaft between a pair of longitudinally spaced limit positions, stirrer drive motor means supported by said carrier structure for rotating said stirrer about a generally vertical axis during reciprocable movement by said traversing mechanism, a roller, means on said carrier structure supporting said roller on top of the shaft for rotation with the periphery thereof frictionally engaged with the upper side of said shaft, said roller supporting means being shiftable between first and second conditions for effecting selective movement of said carrier structure in opposite directions during rotation of said shaft in one direction about a longitudinal axis thereof, and reversing means operative in each of said conditions and at a corresponding one of said limit positions for shifting the supporting means to the other of said conditions, said roller supporting means comprising: a support member journaling said roller, and bearing means for said support member acting directly between said support member and said carrier structure to journal said support member for shiftable pivotal movement between said first and second conditions and about a shift axis in substantially fixed relation to said carrier structure, and said reversing means comprising: a pair of rotating of engagement means disposed in longitudinally spaced relation along said shaft to define said opposite limit positions, a pair of force transmitting means on said carrier structure for operating said roller supporting means from one of said conditions to the other, said support member having gear teeth thereon, and said force transmitting means including a pair of members which have gear teeth intermeshed with said gear teeth of said support member and which are journaled on said carrier structure for pivotal movement about a pair of pivot axes fixed relative to the carrier structure and in spaced parallel relation to said shift axis and spaced therefrom in opposite longitudinal directions, said gear teeth of said support member and said gear teeth of said pair of members being at fixed pitch radii with respect to the respective axes of said members, the force transmitting means engaging the engagement means to shift the support member between the first and second conditions.

2. Grain stirring apparatus as defined in claim 1, further comprising: a carriage supporting said traversing mechanism, means supporting said carriage for reciprocable rectilinear movement in a horizontal direction generally transverse to the horizontal direction of reciprocable movement of said carrier structure along said shaft, and means for effecting reciprocable movement of said carriage.

3. Grain stirring apparatus as defined in claim 1, said support member bearing means comprising first and second bearing surfaces respectively carried by said carrier structure and said support member and having bearing surfaces extending around said shift axis, said first and second bearing surfaces respectively including first and second thrust bearing surfaces interengageable in a plane transverse to said shift axis for holding the periphery of said roller in engagement with said shaft and to also prevent any substantial canting movement of said support member relative to said carrier structure in either of said first and second conditions.

4. Grain stirring apparatus as defined in claim 3 said shift axis being a generally vertical axis intersecting said shaft axis with said plane of interengagement of said thrust bearing surfaces being generally horizontal and with said first thrust bearing surface being above said second thrust bearing surface, whereby the weight of said carrier structure is applied in part through said thrust bearing surfaces and to said roller to thereby hold said thrust bearing surfaces together and resist canting movement of said support member relative to said carrier structure while also providing enhanced frictional engagement between the periphery of said roller and said shaft.

5. Grain stirring apparatus as defined in claim 4, said stirrer including auger means for effecting upward movement of grain engaged thereby and for thereby exerting an additional downward force on said carrier structure and said thrust bearing surfaces.

6. Grain stirring apparatus as defined in claim 3, said bearing surfaces further including outwardly and inwardly facing cylindrical surface portions in closely spaced relation to limit displacement of said member in any direction transverse to said shift axis.

7. Grain stirring apparatus as defined in claim 1, said pair of engagement means being mounted on said shaft for rotation therewith and each including a plurality of angularly spaced engagement members, and said force transmitting means being engageable by said engagement member and being operative to respond to rotation of said shaft through a certain angle to shift said roller supporting means from one of said conditions to the other.

8. Grain stirring apparatus as defined in claim 7, wherein said force transmitting means includes a pair of arms secured to said pair of members and respectively engageable by said angularly spaced engagement members of said pair of engagement means at said pair of longitudinally spaced limit positions.

9. Grain stirring apparatus as defined in claim 7, further including a second roller, a second support member journaling said second roller and having gear teeth thereon, second bearing means for said second support member acting directly between said second support member and said carrier structure to journal said second support member for shiftable pivotal movement between first and second conditions and about a second shift axis parallel to the first-mentioned shift axis and in substantially fixed relation to said carrier structure, and a shift member journaled for pivotal movement about an axis between said second shift axis and said first-mentioned shift axis and having gear teeth meshed with said gear teeth of said first-mentioned and second support members.

10. Grain stirring apparatus as defined in claim 1, said shift axis being generally transverse to and in intersecting relation to said longitudinal shaft axis, and said roller being journalled for rotation about an axis generally transverse to said shift axis in a plane in generally spaced parallel relation to said shaft axis, said roller axis in said first and second conditions being at opposite acute angles to a line parallel to said shaft axis to thereby selectively position said roller to drive said carrier structure in said opposite directions with the periphery of said roller frictionally engaged with said shaft and with said shaft rotated in one direction.

* * * * *

UNITED STATES PATENT AND TRADEMARK OFFICE
CERTIFICATE OF CORRECTION

PATENT NO. : 4,854,719

DATED : August 8, 1989

INVENTOR(S) : Eugene G. Sukup

It is certified that error appears in the above-identified patent and that said Letters Patent is hereby corrected as shown below:

Column 7, line 41, after "rotating," delete "of".

Column 8, line 7, after "second" insert --planar--.

Column 8, line 41, "member" should read --members--.

Signed and Sealed this

Nineteenth Day of June, 1990

*Attest:*

HARRY F. MANBECK, JR.

*Attesting Officer* *Commissioner of Patents and Trademarks*